TAKEUP FOR ACCOMMODATING SLACK AND TENSION VARIATIONS

Filed April 17, 1964

Inventor:
Herman Epstein
By: James J. Jennings, Jr. Atty.

3,261,566
Patented July 19, 1966

3,261,566
TAKEUP FOR ACCOMMODATING SLACK AND TENSION VARIATIONS

Herman Epstein, Philadelphia, Pa., assignor to Omnitronics, Inc., Philadelphia, Pa., a corporation of Delaware Filed Apr. 17, 1964, Ser. No. 360,503
6 Claims. (Cl. 242—75.3)

The present invention is directed to an energy storage and return arrangement, and more particularly to such arrangement which accommodates tension changes in a rapidly moving strand of material, such as a tape or paper web passing through a photoelectric tape reader.

In the field of tape displacement for automatic reading, printing or other operations, high speeds have been attained, of the order of 500–600 inches per second. With certain equipment, such as photoelectric tape readers, it is desired to provide for both continuous reading or continuous displacement of the tape, and at other times to selectively cause intermittent operation, or stepping, of the tape through the system. The tape is normally fed to the reader from a tape supply unit such as a reeler, spooler, etc., which generally includes a slack take-up means such as a spring-biased dancer arm adjacent the output point of the tape supply unit.

Responsive to variations in the amount of slack and/or the level of tension in the tape at the output point of the reeler, the position of the roller at the extremity of the dancer arm is likewise varied (under the urging of a known bias arrangement) to accommodate the slack and/or tension variations. It is possible that the dancer arm assembly may have a resonant frequency very close to one of the different frequencies at which the tape can be stepped through the reader. For example, if the dancer arm assembly has a resonant frequency of about 30 cycles per second, and if the tape is stepped through the reader of such system at a frequency near 30 c.p.s., it may happen that after the tape is advanced and halted in the reader in exactly the proper reading position, a minute fraction of a second later the dancer arm may "bounce" or move suddenly to take up the slack momentarily created by halting tape movement through the reader. This bounce may be sufficient to displace the tape in the reader from the proper reading position, even to the extent of causing double reading at times. Such undesired movement and double reading has been noted in tape handling systems wherein the first element in the reader which positively engages the tape is completely stationary, having no resiliency or flexibility to accommodate the slack or or tension variations occasioned by the bounce of the dancer arm. One known form of tape guide frequently used at the input point of the reader unit includes a roller or rotatable shaft, but such roller rotates about a fixed center and thus can be considered as a stationary, inflexible input means for purposes of the present description. In addition to this primary drawback of prior art systems, which causes undesired tape displacement as the dancer arm bounces, a secondary failing of such systems includes the possible breakage or tearing of the tape because of the tension change produced by the bounce of the dancer arm.

It is therefore a primary object of the present invention to provide an improved tape handling unit, for operation with associated units having slack take-up means, which obviates undesired tape displacement in the tape handling unit which might otherwise be caused by changes in tension between adjacent units.

A more specific object of the invention is the provision, adjacent the input section of the tape handling unit, of an energy storage and return arrangement which will accommodate the slack and/or tension changes without tape jitter during system operation.

In a preferred embodiment the tape handling unit may be a photoelectric tape reader which receives tape from a reeler or other supply unit having a slack take-up assembly adjacent its output point. The novel and unobvious energy storage and return arrangement of the present invention includes, in one embodiment, a base unit extending from the front panel at substantially right angles. In accordance with an important aspect of the present invention, a resilient unit, which may be a cantilever spring, is affixed to the base unit and extends substantially normal thereto, paralleling the front panel of the tape handling unit and aligned with the tape path. With this arrangement the cantilever spring has considerable "give" or flexure to accommodate the changes in tape tension between the reader and an associated tape supply unit. Accordingly undesired tape movement due to dancer arm "bounce" is substantially obviated with the inventive structure.

In order to acquaint those skilled in the art with the best mode contemplated for making and using the invention, a description thereof is set forth in connection with the accompanying drawing, in the several figures of which like reference numerals identify like elements, and in which.

*General system arrangement*

Figures 1, 2, 3:
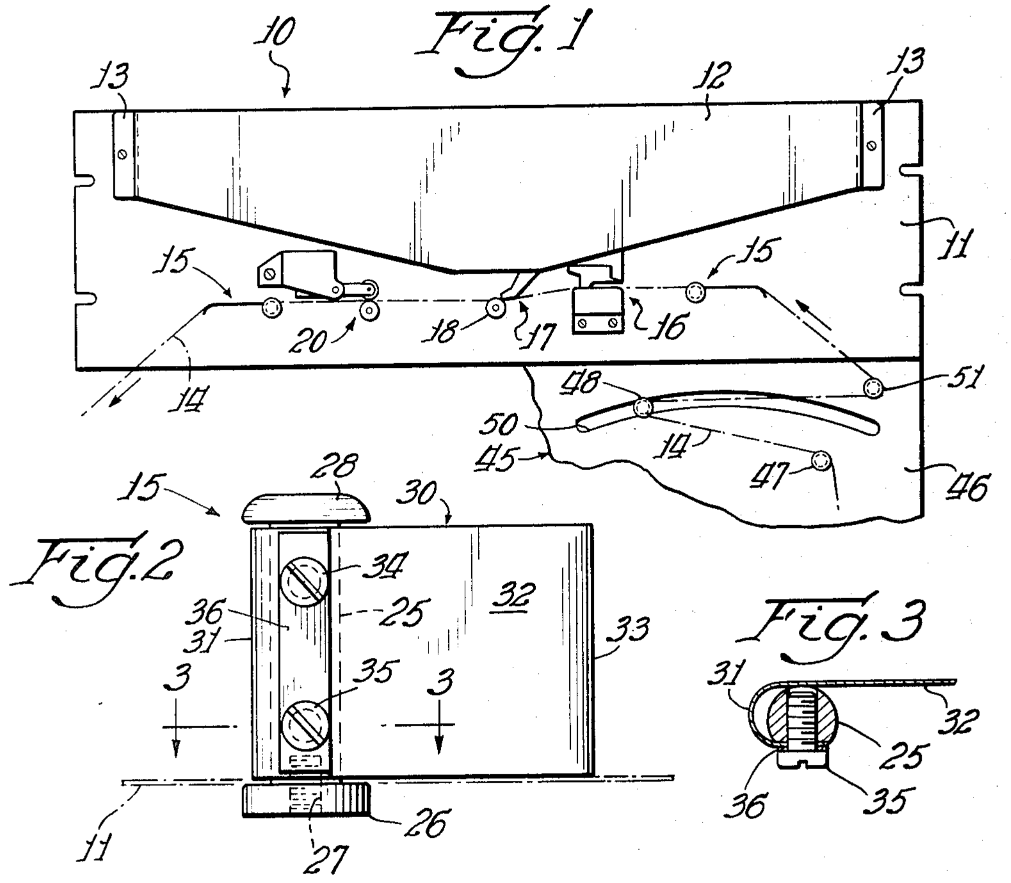
FIGURE 1 is a front view of a photoelectric tape reader with the present invention, and showing a portion of an associated reeler unit.
FIGURE 2 is a bottom view, taken on a scale enlarged with respect to that of FIGURE 1, depicting a preferred embodiment of the invention.
FIGURE 3 is a sectional showing, taken along the lines 3—3 of FIGURE 2, illustrating certain fastening details of the inventive structure.

FIGURE 1 depicts a photoelectric tape reader 10 and a portion of an associated tape supply unit 45, shown as a tape reeler. Reader unit 10 includes a front panel 11, a hood or protective panel 12 having a pair of flange portions 13 by which the hood is affixed to the front panel, and other components affixed to the front panel 11 of the reader. Reeler 45 has a front panel 46, a fixed tape guide 47, a dancer arm assembly including a roller 48 extending through an arcuate slot 50, and a fixed tape guide 51 at the output point of the reeler. Thus the slack take-up means, or dancer arm assembly, is positioned adjacent the output point of the tape supply unit 45. The tape or web 14 is shown passing upwardly from reeler 45 and over a first energy storage and return assembly 15, constructed in accordance with the present invention. This first assembly 15 may be considered the input point of the reader system. The tape is led through the components of a brake assembly 16, under a read head 17, over an adjustable tape guide 18 and between the rollers of a capstan drive arrangement 20. At the opposite side of the reader system, tape 14 passes over another energy storage and return arrangement 15, which may be considered the output point of the reader system, to a take-up reel (not shown) of the reeler. With this general perspective of the system including the photoelectric reader and the locations of the invention, the components of the present invention will now be described.

*Energy storage and return arrangement*

As indicated in FIGURE 2, the novel and unobvious structure of the invention comprises a base unit, or support shaft 25, extending outwardly at substantially right angles from front panel 11 of the tape handling unit. Support shaft 25 is secured in place by a member 26, the head portion of which is positioned behind the front panel and which includes a threaded portion 27 which extends through an aperture of panel 11 and is received in a correspondingly tapped bore of shaft 25. The other end of support shaft 25, the one farther from reference panel 11, is terminated in a retaining means or collar 28, of a diameter appreciably larger than that of shaft 25. Annular tape retaining means 28 serves to restrain the moving tape from displacement away from reference panel 11 during system operation. Collar 28 may be a separate unit threaded into, or otherwise affixed to, shaft 25, or may be formed integrally with shaft 25, as was done in the preferred embodiment.

Affixed to base unit 25 is a resilient unit 30, which in the preferred embodiment was comprised of a cantilever type spring. The spring included a first arcuate or generally semi-circular end portion 31, also visible in FIGURE 4. The central portion 32 of spring 31 is substantially flat, and the other end portion 33 is curved or arcuate in configuration as illustrated. From the showing of FIGURE 1, it is apparent that at the input point of the reader system, tape 14 is passing upwardly and to the left at an angle with respect to the generally horizontal path in the reader system itself. Accordingly, to avoid snags and tearing of the tape, the edge portion 33 of resilient unit 30 is curved as indicated in the drawing.

In the bottom view of FIGURE 2, a pair of fastening screws 34 and 35 are indicated and these screws represent the means for fastening cantilever spring 30 to support shaft 25. As better illustrated in FIGURE 3, fastening screw 35 includes a slotted head portion and a threaded portion which extends through a corresponding aperture of spring 30 and is received in a correspondingly tapped bore of shaft 25. This arrangement provides for secure anchoring of the cantilever spring to the base unit 25. Also indicated in FIGURE 3 is fastening plate 36 which extends across the width of spring 30 to assist in securing the resilient spring to the support shaft 25.

Figure 4:
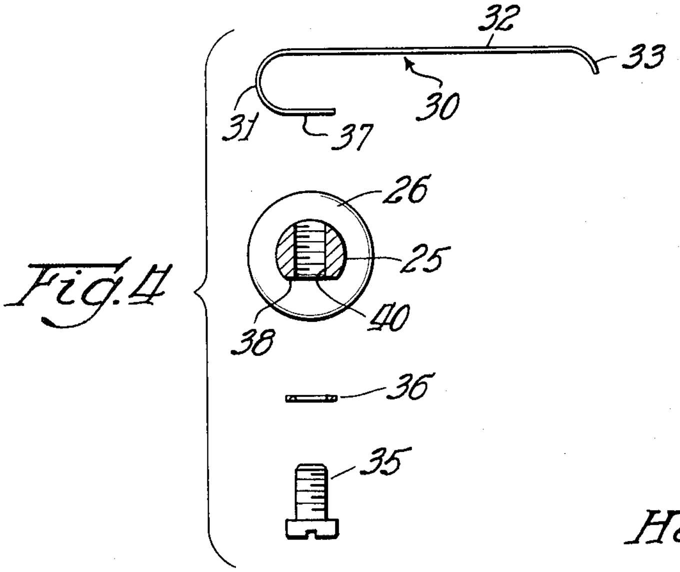
FIGURE 4 is an exploded view depicting components of the invention before assembly.

The exploded view of FIGURE 4 shows the components just described, and further indicates the generally flat portion 37 of resilient unit 30 which is provided adjacent semi-circular portion 31 of this spring. The flattened spring portion 37 is positioned adjacent the similarly flattened surface 38 of support shaft 25, and fastening plate 36 is positioned adjacent to spring portion 37. Fastening screws 34 and 35 are inserted into tapped bore portions 40 of the support shaft to complete the assembly.

In operation, the stepping or rapid starting and stopping of tape movement through the system alternately increases and decreases the level of the tension forces in tape 14. As these forces increase, spring 30 tends to flex or to be displaced in a first direction. That is, although end portion 31 of the spring is securely anchored, the other end portion 33 is deflected downwardly (with reference to FIGURES 1 and 4) responsive to increased tension in the tape. With such flexure of the spring, energy is stored in the assembly 15 and thereafter, as the tension forces decrease, end portion 33 of resilient unit 30 is displaced upwardly, or in a direction opposite the given direction in which it was initially displaced. With this return movement the stored energy is also returned from the assembly 15. Such operation has greatly enhanced the reliability of the reader system by substantially eliminating tape jitter or undesired movement which has frequently been occasioned by "bounce" of the dancer arm when the tape is stepped at a frequency near the resonant frequency of the dancer arm assembly.

Although only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. In a tape handling system, a supply unit for delivering tape at an output point, means including a dancer arm positioned adjacent the output point of the supply unit for accommodating tension and slack variations in the tape, a tape processing unit having a reference panel and an input point for receiving tape from the supply unit, to provide a tape path between the output point of the supply unit and the input point of the processing unit, and means positioned at the input point of said tape processing unit, including a support shaft disposed substantially normal to the panel and to the tape path, and spring means affixed to said shaft and aligned with the tape path substantially parallel to said panel, for storing energy by movement in a given direction as the tape tension increases and returning energy by movement in a direction opposite said given direction as the tape tension decreases, whereby the position of the tape in said tape processing unit is not affected by movement of said dancer arm, thus to insure positive operation of the processing unit.

2. In a tape handling system, a supply unit for delivering tape at an output point, a dancer arm positioned adjacent the output point of the supply unit for accommodating tension and slack variations in the tape, a tape processing unit having a reference panel and an input point for receiving tape from the supply unit, to provide a tape path between the output point of the supply unit and the input point of the processing unit, and means positioned at the input point of said tape processing unit, including a support shaft disposed substantially normal to the reference panel and to the tape path, and spring means having a pair of arcuate end portions and a substantially linear intermediate portion, one of said spring end portions being affixed to said shaft and said intermediate portion being aligned with the tape path substantially parallel to said panel, for accommodating aberrations in tape tension by related flexing of at least a portion of the spring means, whereby the position of the tape in said tape processing unit is not affected by movement of said dancer arm, thus to insure positive operation of the processing unit.

3. In a tape supplying and reading system, a tape reeler unit for supplying tape at an output point, dancer arm means positioned adjacent the output point of the reeler unit for accommodating tension and slack variations in the tape, a tape reader unit having a front panel and an input point for receiving tape from the reeler unit, to define a tape path between the output point of the reeler unit and the input point of the reader unit, and means positioned at the input point of said tape reader unit, including a support shaft disposed substantially normal to the front panel and to the tape path, spring means affixed to the shaft and aligned with the tape path for storing energy by flexing as the tape becomes more taut and returning energy by straightening as the tape becomes more slack, and retaining means, affixed to the end of the support shaft farther from the front panel, for maintaining the tape in said path as the tape passes over the spring means, whereby the position of the tape in said reader unit is not affected by movement of the dancer arm, thus to insure positive operation of the reader unit.

4. An energy storage and return arrangement for the input point of a photoelectric reader including a front panel and a tape path adjacent such panel, tape being received over such path from a tape supply unit having a dancer arm adjacent its output point, said arrangement comprising a support shaft affixed to the front panel, extending substantially normal to the panel and to the tape path, and a cantilever spring having at least one arcuate end portion, a second end portion, and a substantially flat intermediate portion, said second end portion being affixed to said shaft and said intermediate spring portion being aligned with the tape path substantially parallel to said panel in a position to afford tape movement over said arcuate end portion of the spring, for accommodating aberrations in tape tension by related flexing of the cantilever spring about said second end portion, thereby insuring positive reader operation.

5. An energy storage and return arrangement for a tape handling unit having a front panel, with tape being received from a tape supply unit having a dancer arm adjacent its output point, comprising a support shaft affixed to the front panel at substantially right angles and aligned with the tape path, spring means, having one end affixed to the shaft and a central portion aligned with the tape path, for storing energy by displacement in a given direction as the tape tension increases and returning the stored energy by movement in a direction opposite said given direction as the tape tension decreases, and collar means, affixed to the end of the support shaft farther from the front panel, for maintaining the tape in said path as the tape passes over the spring means, thus to obviate undesired tape movement responsive to variations in tape tension.

6. For use with a photoelectric tape reader having a front panel adjacent which tape is passed along a given path upon receipt from a reeler having a dancer arm adjacent its output point, an arrangement for accommodating tension variations in the tape and guiding the tape along such path comprising a substantially annular support shaft affixed to, and extending outwardly at substantially right angles from, said panel, said shaft having a flattened portion along the bottom thereof, a cantilever spring having a first generally semicircular end portion for extending partially around said shaft, a substantially flat intermediate portion, and an arcuate end portion for receiving tape without snagging or tearing at the input point of the reader system, means for affixing the semi-circular end portion of the spring to the support shaft, and retaining means, of a diameter larger than the diameter of the support shaft, affixed to the outer end of the support shaft, thereby to retain the tape in the desired path as the body of the cantilever spring flexes to accommodate tension variations of the tape at the input point to the system.

References Cited by the Examiner

UNITED STATES PATENTS

| | | | |
|---|---|---|---|
| 2,262,032 | 11/1941 | Moore | 242—75.3 |
| 2,732,754 | 1/1956 | Foster et al. | 242—55.11 X |
| 2,997,247 | 8/1961 | McGuire et al. | 242—55.12 |
| 3,130,936 | 4/1964 | Rochman | 242—75.3 |

STANLEY N. GILREATH, *Primary Examiner.*

MERVIN STEIN, *Examiner.*

N. L. MINTZ, *Assistant Examiner.*